United States Patent

[11] 3,611,363

[72] Inventors Alan F. McCrea; Hugh V. Snively, both of Henrico County, Va.

[21] Appl. No. 3,085
[22] Filed Jan. 15, 1970
[45] Patented Oct. 5, 1971
[73] Assignee Robertshaw Controls Company Richmond, Va.

[54] ALARM DETECTION SYSTEM
12 Claims, 3 Drawing Figs.

[52] U.S. Cl. .......... 340/413, 340/147 R, 340/213, 340/412, 179/2 R, 179/5 R
[51] Int. Cl. .......... G08b 19/00
[50] Field of Search .......... 340/412, 413, 415, 213, 213.1, 147 R, 182, 184; 325/53, 54; 179/2 R, 5 R

[56] References Cited

UNITED STATES PATENTS

| | | | |
|---|---|---|---|
| 3,040,297 | 6/1962 | Derr et al. .......... | 340/182 |
| 3,189,882 | 6/1965 | Ward .......... | 340/413 |
| 3,428,947 | 2/1969 | Macurdy .......... | 340/147 |

*Primary Examiner*—John W. Caldwell
*Assistant Examiner*—Robert J. Mooney
*Attorneys*—Auzville Jackson, Jr., Robert L. Marben and Anthony A. O'Brien

ABSTRACT: An alarm detection system including a plurality of remote stations, each of the remote stations having a group of field points and an alarm signal generator responsive to an alarm condition at the field points to generate an alarm signal, a telephone line for each of the remote stations, and a central control station communicating with the remote stations through the telephone lines and having a plurality of alarm receivers connected with each telephone line, respectively, to receive alarm signals and initiate a scan of the field points at remote stations generating alarm signals.

PATENTED OCT 5 1971 3,611,363

SHEET 1 OF 2

INVENTORS
Alan F. McCrea
Hugh V. Snively
BY Anthony A. O'Brien
ATTORNEY

INVENTORS,
Alan F. McCrea
Hugh V. Snively
BY Anthony A. O'Brien
ATTORNEY

ALARM DETECTION SYSTEM

BACKGROUND OF THE INVENTION

1. Field of the Invention

The present invention pertains to alarm systems, and more particularly, to centralized alarm detection systems.

2. Description of the Prior Art

Supervisory control systems conventionally utilize telephone lines to provide centralized control and monitoring at a central control station of field points at a plurality of remote stations. Normally, the remote stations are connected in a party line system with the central control station such that signals from the central control station and the remote stations are simultaneously received at all stations. One disadvantage of such systems is that the number of frequency channels which may be used on normal voice-grade telephone lines is limited; and, accordingly, in conventional systems a single frequency channel is utilized for alarm scanning. That is, a fixed frequency transmitter is located at each remote station to transmit an alarm signal at the fixed frequency when an alarm or off-normal condition occurs at any of the field points at a remote station. Once an alarm signal having the fixed frequency is received at the central control station, a scan is initiated of all of the remote stations in order to determine which remote station transmitted the alarm signal. Thereafter, a scan of the field points associated with that remote station is commenced in order to determine the precise field point exhibiting the alarm condition. This requires decoding circuits to activate each remote station when it is properly addressed.

The above-mentioned manner of detecting alarm conditions at remote field points has the disadvantages of slow alarm detection due to the necessity of scanning all remote stations once an alarm signal is received, and of the loss of alarm signals generated at different remote stations simultaneously. That is, since a single fixed frequency is utilized to initiate alarm-scanning operation at the central control station, if two alarm transmitters at different remote stations are energized simultaneously, the alarm signals will mix in such a manner as to cause the central control station to receive a garbled signal not necessarily indicative of an alarm condition.

SUMMARY OF THE INVENTION

Accordingly, it is an object of the present invention to provide an alarm detection system capable of detecting simultaneous alarm signals from different remote stations and immediately determining the remote stations from which alarm signals were transmitted.

The present invention is summarized in an alarm detection system including a plurality of remote stations, each of the remote stations having a group of field points and an alarm signal generator responsive to the existence of an alarm condition at any of the field points, a plurality of communication means coupled with the plurality of remote stations, and a central control station having a point address generator, a plurality of receivers coupled with the communication means to receive the alarm signals and supply an output to the point address generator, and control means selectively controlling communication between the remote stations and the central control station whereby the field points at a remote station generating an alarm signal are scanned by the address signals.

Another object of the present invention is to reduce the number of frequency channels required to provide supervisory control of a plurality of remote stations.

A further object of the present invention is to obviate the necessity of decoding circuits for activating individual remote station in a centralized alarm detection system.

Some of the advantages of the present invention over prior supervisory control systems are that alarm or off-normal conditions may be immediately detected, simultaneous alarm conditions at different remote stations are detected without loss, and the amount of circuitry necessary to properly address and communicate with a central control station and a plurality of remote stations is reduced.

Further objects and advantages of the present invention will become apparent from the following description of the preferred embodiment when taken in conjunction with the accompanying drawings.

DESCRIPTION OF THE PREFERRED EMBODIMENT

Figure 1:
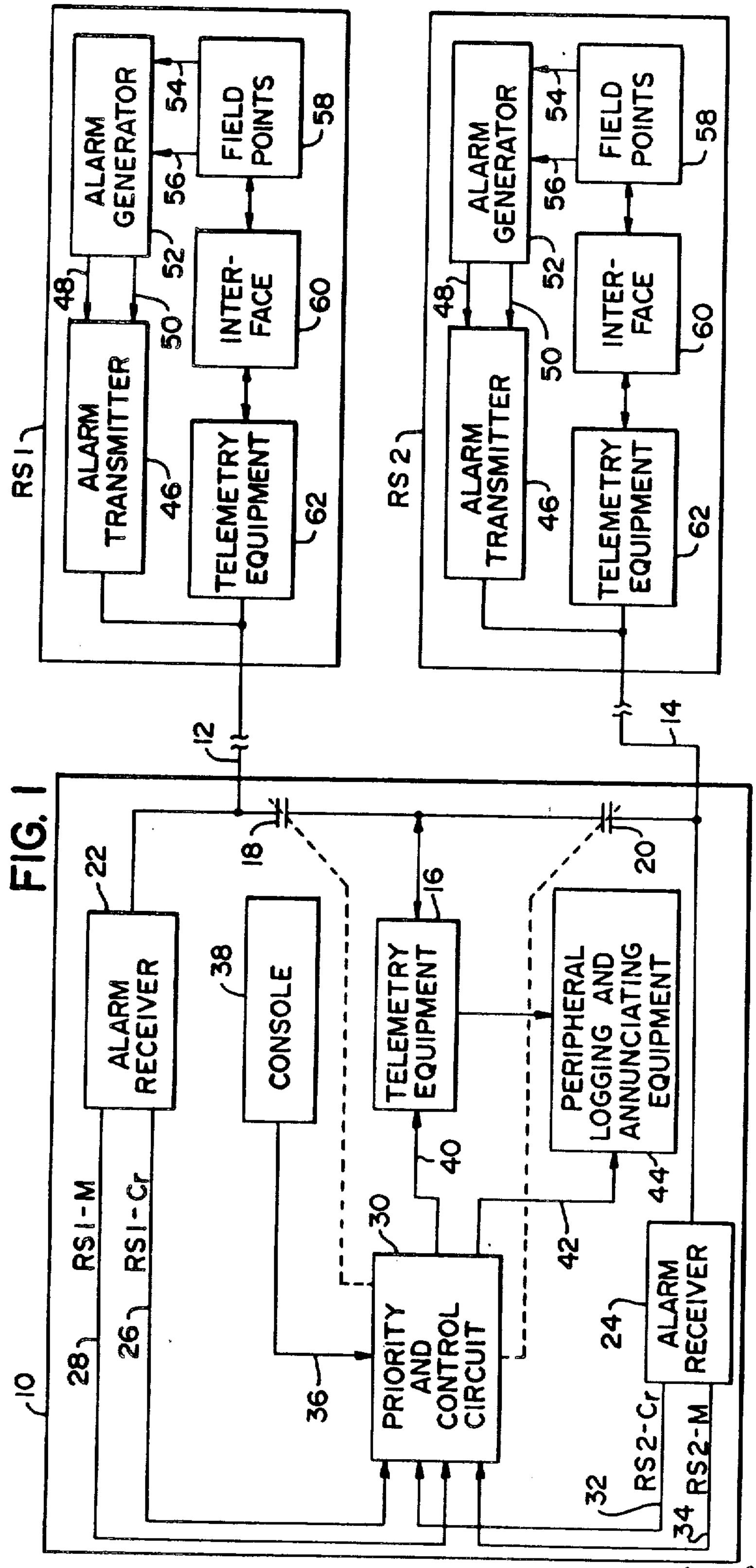
FIG. 1 is a block diagram of the alarm detection system of the present invention.

An alarm detection system according to the present invention is illustrated in FIG. 1 and includes a central control station 10 and a plurality of identical remote stations RS1 and RS2. Remote stations RS1 and RS2 are in communication with central control station 10 through voice-grade telephone lines 12 and 14, respectively. While only two remote stations are illustrated in FIG. 1, it should be realized that as many remote stations as are required to provide a complete supervisory control system may be utilized with the alarm detection system of the present invention by merely adding telephone lines therefor.

Central control station 10 includes conventional frequency shift keyed telemetry equipment 16 which is connected with telephone lines 12 and 14 through contacts 18 and 20, respectively. A pair of alarm receivers 22 and 24 receive inputs from telephone lines 12 and 14, respectively. Alarm receiver 22 has outputs 26 and 28 which provide input signals to a priority and control circuit 30 corresponding to critical and maintenance alarms at remote station RS1, respectively. Alarm receiver 24 has outputs 32 and 34 which provide inputs to priority and control circuit 30 corresponding to critical and maintenance alarms at remote station RS2, respectively.

Priority and control circuit 30 receives an input on a multiconductor cable 36 from a console 38 which includes conventional equipment for manually selecting individual field points at the remote stations for monitoring at the central control station. Priority and control circuit 30 supplies an output to telemetry equipment 16 on a multiconductor cable 40, and priority and control circuit 30 supplies another output on a multiconductor cable 42 to peripheral logging and annunciation equipment 44.

Each remote station includes a frequency shift keyed alarm transmitter 46 which receives inputs on leads 48 and 50 from an alarm signal generator 52 corresponding to critical and maintenance alarm signals, respectively. Generator 52 receives inputs 54 and 56 from a group of field points 58 corresponding to critical and maintenance alarms, respectively; and an interface 60 interconnects the group of field points 58 with telemetry equipment 62. Any number of field points may be included in each group, and the field points may be arranged in any suitable manner. For example, if it is desired to have 400 field points in a group, they may be divided into four sets of 100 points with each set of 100 arranged in a $10 \times 10$ matrix, Similarly, the 400 field points could be arranged in a $20 \times 20$ matrix.

The alarm transmitters 46 at the remote stations and the alarm receivers 22 and 24 at central control station 10 operate on the same fixed frequency such that only a single frequency channel is utilized for alarm detection. Telemetry equipment 16 at the central control station and telemetry equipment 60 at the remote stations include a plurality of transmitters and receivers therein operating over a plurality of frequency channels to provide various conventional monitoring operations such as contact status, control of motors or other devices and analog telemetering.

Figure 2:
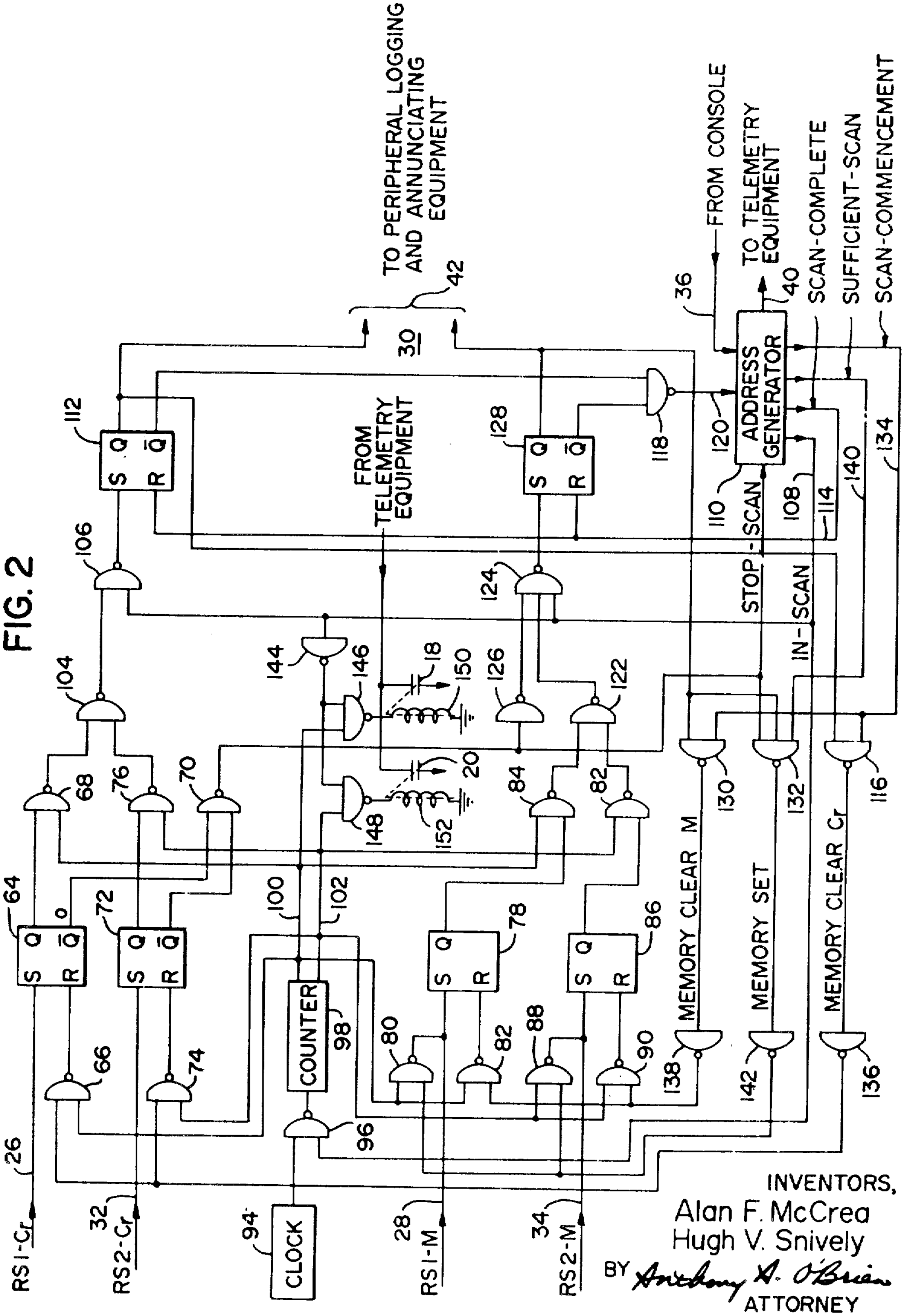
FIG. 2 is a schematic diagram of the priority and control circuit of FIG. 1.

Priority and control circuit 30 is illustrated in FIG. 2 and includes a plurality of set-reset flip-flops each of which includes set S and reset R inputs and Q and $\overline{Q}$ outputs. The set-reset flip-flops are triggered by a 0 on either set or reset input, and the receipt of the 0 at either set or reset input places a 1 at either output Q or $\overline{Q}$, respectively. Thus, when a flip-flop is set, the Q output is 1 and the $\overline{Q}$ output is o; and when a flip-flop is reset, the Q output is 0 and the $\overline{Q}$ output is 1. The gates utilized in providing the logic for priority and control circuit 30 are NAND gates which supply a 0 output when all of their inputs are 1'and otherwise provide a 1 output. It should be clear that while the logic of priority and control circuit 30 has been accomplished with NAND gates the logic could be provided by various other gates within the scope of the present invention.

A memory flip-flop 64 receives a set input from output 26 from alarm receiver 22 corresponding to a critical scan initiation signal from remote station RS1. The reset input of memory flip-flop 64 receives an output from a two-input NAND gate 66. The Q output of memory flip-flop 64 supplies an input to a two-input NAND gate 68, and the $\overline{Q}$ output of memory flip-flop 64 supplies an input to a two-input NAND gate 70. A memory flip-flop 72 receives a set input from output 32 of alarm receiver 24 corresponding to a critical scan initiation signal from remote station RS2. The reset input of memory flip-flop 72 receives an output of a two-input NAND gate 74. The Q output of memory flip-flop 72 supplies an input to a two-input NAND gate 76, and the $\overline{Q}$ output of memory flip-flop 72 supplies a second input to gate 70. Memory flip-flops 64 and 72 store critical alarm signals received from the remote stations; and, accordingly, the number of alarm memory flip-flops is dependent on the number of remote stations in the system.

A memory flip-flop 78 receives a set input from output 28 of alarm receiver 22 corresponding to a maintenance scan initiation signal from remote station RS1 and from an output from a two-input NAND gate 80. The reset input of memory flip-flop 78 receives an output from a two-input NAND gate 82, and the Q output of memory flip-flop 78 supplies an input to a two-input NAND gate 84. A memory flip-flop 86 receives a set input from output 34 of alarm receiver 24 corresponding to a maintenance scan initiation signal from remote station RS2 and from an output of a two-input NAND gate 88. The reset input of memory flip-flop 86 receives an output from a two-input NAND gate 90, and the Q output of memory flip-flop 86 supplies an input to a two-input NAND gate 92. Memory flip-flops 78 and 86 store maintenance alarm signals received from the remote stations; and, accordingly, the number of maintenance memory flip-flops is dependent on the number of remote stations in the system.

A clock source 94 supplies clock pulses to an input of a two-input NAND gate 96, and the output of gate 96 is supplied to a binary counter 98. Counter 98 has a count equal to the number of remote stations in the system; and, accordingly, while no converter is necessary to convert from binary to decimal outputs due to the illustrative embodiment including only two remote stations, it should be noted that if more than two remote stations are utilized in the system the output of counter 98 will be applied to a converter to provide outputs according to the total number of remote stations. Counter 98 has two outputs 100 and 102 with output 100 corresponding to remote station RS1 and output 102 corresponding to remote station RS2. Output 100 is supplied as an input to gates 66 and 68 for critical alarm memory and as an input to gates 80, 82 and 84 for maintenance alarm memory. Output 102 is supplied as an input to gates 74 and 76 for critical alarm memory as an input to gates 88, 90 and 92 for maintenance alarm memory.

The outputs from critical alarm memory gates 68 and 76 are supplied to a two-input NAND gate 104 which supplies an input to a two-input NAND gate 106 which receives a second input on a lead 108 corresponding to in-scan status of a point address signal generator 110. An active level flip-flip 112 for critical alarms receives a set input from the output of gate 106 and a reset input on a lead 114 from generator 110 corresponding to scan-completion. The Q output of active level flip-flop 112 supplies an output to peripheral logging and annunciation equipment 44 on cable 42 and also supplies an input to a two-input NAND gate 116. The $\overline{Q}$ output of active level flip-flop 112 supplies an input to a two-input NAND gate 118 which has an output supplying a scan-initiate input 120 to generator 110.

The outputs of gates 84 and 92 are supplied as inputs to a two-input NAND gate 122 which supplies an input to a three-input NAND gate 124. A second input to gate 124 is received from the output of gate 70 inverted at a NAND gate 126, and a third input to gate 124 receives an in-scan output from generator 110 on lead 108. An active level flip-flop 128 for maintenance alarms receives a set input from the output of gate 124, and the reset input of active level flip-flop 128 receives the scan-complete output from generator 110 on lead 114. The Q output of active level flip-flop 128 supplies a signal to peripheral logging and annunciation equipment 44 on cable 42 and also supplies an input to a two-input NAND gate 130 and a three-input NAND gate 132. The $\overline{Q}$ output of active level flip-flop 128 is supplied as an input to gate 118.

Gate 116 receives a scan-commencement output on a lead 134 from generator 110, and the output of gate 116 provides a critical memory clear signal to gates 66 and 74 after inversion at a NAND gate 136. Gate 130 also receives the scan-commencement output from generator 110, and the output of gate 130 provides a maintenance memory clear signal to gates 82 and 90 after inversion at a NAND gate 138. Gate 132 receives a sufficient-scan output on a lead 140 from generator 110 and the output of gate 70.

The output of gate 132 provides a memory set signal which is inverted at a NAND gate 142 and supplied as an input to gates 80 and 88. The in-scan output on lead 108 from generator 110 is inverted at a NAND gate 144 and supplied as inputs to a pair of two-input NAND gates 146 and 148. The other input to gate 146 receives output 100 corresponding to remote station RS1 from generator 110, and the output of gate 146 energizes a coil 150 which controls the operation of contacts 18. The other input to gate 148 receives output 102 corresponding to remote station RS2 from converter 110 and the output of gate 148 energizes a coil 152 which controls the operation of contacts 20. The in-scan output on lead 108 from generator 110 is also supplied as an input to gate 96 along with the output from clock source 94.

Point address signal generator 110 includes a scanner or counter capable of scanning the maximum number of field points at any remote station. For instance, using the example previously mentioned of 400 field points arranged in four sets of 10 ×10 matrices, generator 110 will sequentially provide address signals corresponding to points 0–399. Of course, the capacity of generator 110 may be increased or decreased as desired. For instance, the capacity of generator 110 may be increased to 1,000 field points if such a number of local points are located in close proximity to the control station to be wired directly without utilizing the telemetry equipment even though the maximum number of field points at any remote station is a lesser number.

A 1 at input 120 initiates a scan by generator 110, and the in-scan output on lead 108 is 0 when a scan is in progress and is 1 when no scan is in progress. The scan-completion output on lead 114 normally provides a 1 and provides a 0 pulse after completion of a scan. The scan-commencement output on lead 134 provides a 1 pulse after the beginning of a scan. The sufficient-scan output on lead 140 is normally 1 and is 0 for a period after a scan is initiated at input 120 until the trailing edge of the scan-commencement pulse in order to prevent the loss of a scan request due to simultaneous enabling of memory set gate 132 and memory clear gate 130.

Figure 3:
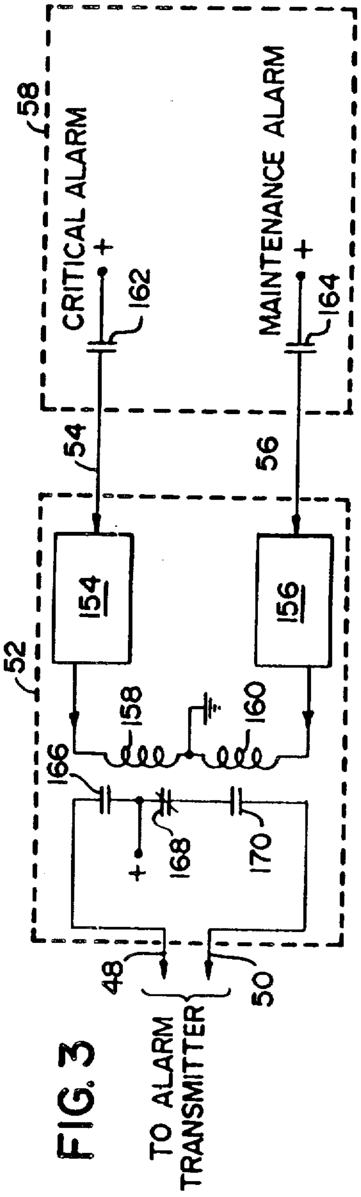
FIG. 3 is a schematic diagram of the alarm generator of FIG. 2.

Alarm generator 52 is illustrated in FIG. 3 and includes monostable multivibrators 154 and 156 controlling the energization of coils 158 and 160, respectively. Monostable multivibrator 154 receives an input on lead 54 from a pair of critical alarm contacts 162 in the group of field points 58 such that when any field point senses and alarm condition of a critical nature contacts 162 close to trigger monostable multivibrator 154. Monostable multivibrator 156 receives an input on lead 56 from a pair of maintenance alarm contacts 164 in the group of field points 58 such that when any field point senses an alarm condition of a maintenance nature contacts 164 close to trigger monostable multivibrator 156.

Monostable multivibrator 154 supplies a pulse of short duration to coil 158 after being triggered to close a pair of normally open contacts 166 and open a pair of normally closed contacts 168. Monostable multivibrator 156 supplies a pulse of relatively long duration to coil 160 after being triggered to close a pair of normally open contacts 170. When coil 158 is energized in response to a critical alarm, positive potential is placed on lead 48 through contacts 166 to operate alarm transmitter 46 to provide a mark signal; and when coil 160 is energized in response to a maintenance alarm, positive potential is placed on lead 50 through contacts 168 and 170 to operate alarm transmitter 46 to provide a space signal. If monostable multivibrators 154 and 156 are triggered simultaneously, the opening of contacts 168 will prevent an output from appearing on lead 50 until the short duration pulse from monostable multivibrator 154 terminates. Similarly, if a critical alarm occurs shortly after a maintenance alarm the output on lead 50 will be interrupted by contacts 168 to change the signal from alarm transmitter 46 from space to mark. Thus, it may be seen that overlapping critical and maintenance alarms at the same remote station are both detected and transmitted without loss of either.

In operation, when an alarm of either a critical or maintenance nature is sensed at any field point at a remote station, alarm transmitter 46 will be energized to provide a mark signal for critical alarms or a space signal for maintenance alarms. The alarm signals from alarm transmitter 46 are received at central control station 10 and applied to the alarm receiver corresponding to the remote station transmitting the alarm signals. For instance, if an alarm signal emanates from remote station RS1, alarm receiver 22 will detect the alarm signal and provide a 0 on output 26 if a critical alarm is sensed or a 0 on output 28 if a maintenance alarm is sensed, Similarly, alarm receiver 24 will provide )0 signals on outputs 32 and 34 corresponding to critical and maintenance alarm signals from alarm transmitter 46 at remote station RS 2. The critical and maintenance scan initiation signals on leads 26, 28, 32 and 34 are received by priority and control circuit 30 and operate generator 110 to scan the field points at the remote station from which the alarm signal emanated, as will be explained in detail with respect to FIG. 2.

Memory flip-flops 64, 72, 78 and 86 and active level flip-flops 112 and 128 are assumed to be in their reset state before reception of scan initiation signals from any of the alarm receivers. Accordingly a critical alarm signal received from output 26 of alarm receiver 22 corresponding to a critical alarm at remote station RS1 will set memory flip-flop 64 and place a 1 on the Q output thereof and a 0 on the $\overline{Q}$ output thereof.

Clock source 94 is continuously running, and clock pulses are supplied to counter 98 to continuously count through the number or remote stations in the system since the output on lead 108 is a 1 indicating that a scan is not in progress at generator 110. Once output 100 of counter 98 has a 1 thereon, gate 68 will be enabled to apply a 0 to gate 104. The output of gate 76 is a 1; and, accordingly, the output of gate 104 is a 1. Since the output on lead 108 is a 1 gate 106 is enabled to apply a 0 to active level flip-flop 112 and set the flip-flop to provide a 1 to peripheral logging and annunciation equipment 44 on cable 42. The $\overline{Q}$ output of active level flip-flop 112 will change to a 0 when the flip-flop is set thereby providing a 1 at the output of gate 118 to initiate a scan by generator 110.

Upon commencement of a scan by generator 110, a 1 will be received at one input of memory clear gate 116, and the other input receives a 1 to enable the gate and provide a 1 to gate 66. Since a scan is now in progress, a 0 on lead 108 from generator 110 will be supplied to gate 96 to prevent clock pulses from further operating counter 98. Accordingly, output 100 of counter 98 will remain at a 1 to permit the enabling of gate 66 to reset memory flip-flop 64. The 0 on lead 108 is also applied as a 1 after inversion at gate 144 to gate 146 along with the 1 output of output 100 of counter 98 to energize coil 150 and close contacts 18. Thus, address signals from generator 110 corresponding to field points at remote station RS1 are supplied to telemetry equipment 16 on cable 40 and are communicated to remote station RS1 through contacts 18 and telephone line 12.

If a critical scan initiation signal is received from output 32 of alarm receiver 24 indicating the existence of a critical alarm at remote station RS2 during a scan by generator 110 in response to active level flip-flop 112, the critical scan initiation signal will be stored in memory flip-flop 72 and will not interrupt the scan in progress. That is, counter 98 will be inhibited due to the 0 in-scan signal supplied to gate 96; and, accordingly, gate 76 cannot be enabled.

If a maintenance scan initiation signal is received from output 34 of alarm receiver 24 indicating the existence of a maintenance alarm at remote station RS2 during a scan by generator 110 in response to active level flip-flip 112, the maintenance scan initiation signal will be stored in memory flip-flop 86 since counter 98 is inhibited thereby preventing the enabling of gate 92. If a maintenance scan initiation signal is received on lead 28 from alarm receiver 22 indicating the existence of a maintenance alarm condition at remote station RS1 during a scan by generator 110 in response to active level flip-flop 112, memory flip-flop 78 will be set, and gate 84 will be enabled to supply a 0 to gate 122 which supplies a 1 to gate 124. Gate 124 will be inhibited, however, due to the 0 on lead 108 indicating the in-scan status of generator 110.

Thus, it may be seen that if a second critical alarm signal is received once a critical scan is in progress, the second critical alarm signal will be stored in the critical memory flip-flops until the end of the scan in progress; and, similarly, if maintenance alarm signals are received from the remote stations, the maintenance alarm signals will be stored in maintenance memory flip-flops 70 and 78 until all scans having higher priority are completed.

In order to illustrate the manner in which priority and control circuit 30 interrupts a lower priority scan to run a higher priority scan, it will be assumed that maintenance active level flip-flop 128 is set to provide a 1 at its Q output to memory clear gate 130 and a 0 at its $\overline{Q}$ output to gate 118 to provide a 1 to generator 110 and initiate a scan. At this time no critical alarm signals have been received or are stored in memory flip-flops 64 or 72. If a critical alarm signal is now received on output 26, memory flip-flop 64 will be set such that a 1 is applied to gate 68. If the remote station at which the maintenance scan was being run is not the same remote station as is exhibiting the critical alarm condition, in this case remote station RS1, gate 68 will not be enabled thereby placing a 1 at the output thereof. Since the output of gate 76 will also be a 1,gate 104 is enabled to supply a 0 to gate 106 thereby preventing the setting of active level flip-flop 112. When memory flip-flop 64 is set, the 0 on the $\overline{Q}$ output thereof permits gate 70 to provide a 1 to memory set gate 132, a 0 to gate 124, and a 1 to the stop-scan input of generator 110 to stop the maintenance scan in progress. Memory set gate 132 receives 1's at all of its inputs at this time and in enabled to set the memory flip-flop 78 or 86 which initiated the maintenance scan in progress to permit the maintenance scan to be run after completion of the critical scan. The 0 supplied to gate 124 inhibits the enabling thereof to prevent the setting of maintenance active level flip-flop 128.

Once the scan in progress is stopped, a scan-complete 0 is placed on lead 114 to reset the maintenance active level flip-flops, and a 1 is placed on lead 108 indicating the not-in-scan status of generator 110 thereby enabling gate 96 and permitting operation of counter 98 by the clock pulses from clock source 94 until the counter output coinciding with the remote station exhibiting the critical alarm, in this case remote station RS1, is energized. When output 100, corresponding to remote station RS1, is energized gate 68 is enabled to place a o at the input of gate 104 thereby placing a 1 on gate 106 and setting active level flip-flop 112 to supply a 1 to input 120 of generator 110 to commence a critical level scan in the manner above described.

Once the critical scan is completed, the maintenance scan previously in progress will be reinitiated due to the setting of the proper maintenance memory flip-flop 70 or 78, and the enabling of gate 96. The only time that maintenance active level flip-flop 128 can be set is when neither of critical memory flip-flops 64 or 72 is set such that gate 70 is enabled to permit enabling of gate 124. Thus, all higher priority scans are completed prior to lower priority scans, and all lower priority scans whether interrupted or received after the initiation of a higher priority scan are run in turn according to priorities.

Point address generator 110 operates to provide address signals to telemetry equipment 16 for coding and transmission as mark, space and carrier signals. For instance, using the previous example of 400 field points arranged in four sets of 10 ×10 matrices, telemetry equipment 16 includes three FSK transmitters for units, three FSK transmitters for tens and two FSK transmitters for hundreds sets. Generator 110 accordingly provides outputs on cable 40 to selectively operate the transmitters in their mark, space and carrier modes. Telemetry equipment 62 at the remote stations includes FSK receivers corresponding to the FSK transmitters to receive the mark, space and carrier signals and supply them to interface 60 for decoding to select individual field points.

Telemetry equipment 16 also includes FSK transmitters to communicate date corresponding to functions to be performed at the remote stations. Telemetry equipment 62 at the remote stations includes FSK receivers for the function transmitters and further includes FSK analog transmitters for transmitting analog signals to central control station 10. Telemetry equipment 62 also includes FSK transmitters for communicating contact status or alarm conditions at the field points to corresponding FSK receivers at central control station 10 such that field points sensing an alarm condition can be detected during a scan by generator 110.

FSK transmitters and receivers which may be used with the present invention are manufactured by Quindar Electronics as model numbers QT–30 and QR–30, respectively.

An individual field point may be selected for control operation from console 38 by pressing buttons thereat which will select the proper field point and provide address signals from generator 110 corresponding thereto. When a point is selected at the console, the contacts associated with the remote station at which the point is located will be closed to permit communication with that point.

The alarm detection system of the present invention permits immediate detection of the remote station at which an alarm condition exists and prevents the loss of any alarm signals simultaneously transmitted by the remote stations. The priority and control circuit permits the ranking of priorities to assure that the most important alarms are detected prior less important alarms. Furthermore, the use of counter 98 permits the remote stations to be arranged in order of their importance to thereby detect alarms of the same priority in order of remote station importance to thereby detect alarms of the same priority in order of remote station importance during a scan by counter 98.

Inasmuch as the present invention is subject to many variations, modifications and changes in detail it is intended that all matter contained in the foreqoing description or shown in the accompanying drawings shall be interpreted as illustrative and not in a limiting sense.

What is claimed is:

1. An alarm detection system comprising a plurality of remote stations, each of said remote stations
   including
      a group of field points, and
      alarm-signal-generating means connected with said group of field points to generate an alarm signal in response to the existence of an alarm condition at any of said field points;
   a plurality of communication means coupled with said plurality of remote stations; and
   a central control station including
      address-generating means for generating address signals corresponding to individual field points at said remote stations,
      a plurality of receiving means coupled with said plurality of communication means to receive said alarm signals and having output means connected with said address-generating means, and
      control means coupled with said address-generating means and said plurality of communication means for selectively controlling communication between said remote stations and said central control station whereby said control means is responsive to an alarm signal from one of said remote stations to establish communication between said one remote station and said central control station to permit scanning of said group of field points at said one remote station by said address signals.

2. The invention as recited in claim 1 wherein said control means includes input means for receiving said alarm signals from each of said alarm-signal-receiving means separately, scanning means for interrogating said input means to determine which of said remote stations generated said alarm signals, and switch means connected with said plurality of communication means and responsive to said scanning means to selectively establish communication with said remote stations 3. The invention as recited in claim 2 wherein said input means includes storage means for each of said receiving means, and said scanning means includes counting means for sequentially providing pulses to said storage means corresponding to the number of said remote stations included in said alarm detection system.

4. The invention as recited in claim 3 wherein said plurality of communication means includes a plurality of telephone lines, and said switch means includes a pair of contacts connecting each of said telephone lines with said address-signal-generating means.

5. The invention as recited in claim 1 wherein said alarm-signal -generating means means generates high-priority alarm signals and low-priority alarm signals in response to high-priority and low-priority alarm conditions existing at said field points, respectively, and said control means includes priority means for establishing communication with said remote stations generating said high-priority alarm signals before establishing communication with said remote stations generating said low-priority alarm signals.

6. The invention as recited in claim 5 wherein said control means includes input means for receiving said high-priority and low-priority alarm signals from each of said receiving means separately scanning means for interrogating said input means to determine which of said remote stations generated said high-priority and low-priority alarm signals, and switch means connnected with said plurality of communication means and responsive to said scanning means and said priority means to selectively establish communication with said remote stations.

7. The invention as recited in claim 6 wherein said input means includes storage means for each of said high-priority and low-priority alarm signals from each of said receiving means, and said scanning means includes counting means for sequentially providing pulses to said storage means corresponding to the number of said remote stations included in said alarm detection system.

8. The invention as recited in claim 5 wherein said alarm-signal-generating means includes first means responsive to high-priority alarm conditions existing at said field points to provide a high-priority pulse, and second means responsive to low-priority alarm conditions existing at said field points to provide a low-priority pulse.

9. The invention as recited in claim 8 wherein said alarm-signal-generating means includes a transmitter connected with said first means and said second means and providing a first frequency signal in response to said high-priority pulse and a second frequency signal in response to said low-priority pulse.

10. The invention as recited in claim 9 wherein said first means includes a first monostable multivibrator, said second means includes a second monostable multivibrator, and the duration of said low-priority pulse is greater than the duration of said high-priority pulse.

11. The invention as recited in claim 10 wherein said alarm-signal-generating means includes means responsive to operation of said first means to inhibit the operation of said second means.

12. The invention as recited in claim 5 wherein said control means includes a first plurality of memory flip-flops receiving said high-priority alarm signals from each of said receiving means, a second plurality of memory flip-flops receiving said low-priority alarm signals from each of said receiving means, a first active level flip-flop receiving the outputs from said first plurality of memory flip-flops, and a second active level flip-flop receiving the outputs from said second plurality of memory flip-flops, said first and second active level flip-flops having outputs connected with said address-generating means.